Patented Oct. 16, 1928.

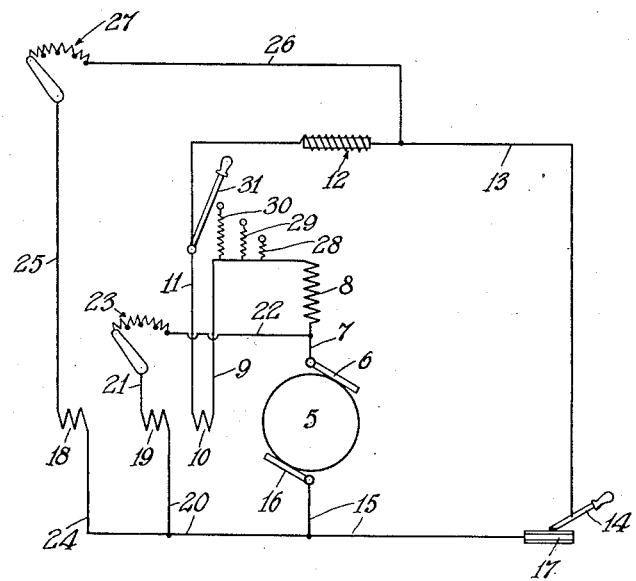

1,687,492

UNITED STATES PATENT OFFICE.

ALEXANDER CHURCHWARD, OF NEW YORK, N. Y., ASSIGNOR TO WILSON WELDER & METALS COMPANY, INC., A CORPORATION OF NEW YORK.

ELECTRIC WELDING APPARATUS.

Application filed August 8, 1924. Serial No. 730,816.

This invention relates to electric welding apparatus and has for one of its primary objects the provision of an improved means for so regulating the welding current as to maintain at the arc a constant current regardless of such variations in resistance as may occur incident to variations in the length of the arc.

Other objects and certain advantages of the invention will become apparent from the following description when taken in connection with the accompanying drawing, in which the apparatus embodying my invention is diagrammatically shown.

Referring to the drawing, the numeral 5 indicates the armature of a generator, to one of the brushes 6 of which are, by means of a conductor 7, connected interpole windings 8. These windings are, in turn, by means of a conductor 9, connected in series with field windings 10, which, by means of a conductor 11, are connected, through a suitable reactance unit 12, to a conductor 13, leading to the welding electrode 14. The circuit thus far described constitutes one leg of the welding circuit, and the other portion of the welding circuit comprises a conductor 15 connecting the generator brush 16 with the work 17.

For a purpose hereinafter explained, instead of employing a single set of shunt field coils, I make use of two such sets of coils designated respectively by the numerals 18 and 19. One end of the shunt field coils 19 is connected to the brush 16 by means of a conductor 20 leading to the conductor 15, and the other end of said field coils 19 is connected to the conductor 7 leading to the brush 6, through conductors 21 and 22 between which is interposed a variable resistance or field rheostat 23. The shunt field coils 19, may, therefore, be considered as connected directly to the generator brushes through a field resistance which affords a means for adjusting the voltage of the generator when the welding circuit is open at the electrodes. The other set of shunt field coils 18, is at one end connected to the conductor 20 by means of a conductor 24 and is, at its other end, connected to the conductor 13 by means of conductors 25 and 26 between which is interposed a suitable variable resistance or field rheostat indicated by the numeral 27. The shunt field coils 18 may, therefore, be considered as connected directly to the welding electrodes, that is, across the welding arc, through a manually variable resistance.

In order to make it possible to vary the current passing through the series field windings 10 and consequently effect a corresponding variation in the current supplied to the welding circuit, I have provided a plurality of resistance units 28, 29 and 30, of different respective values, which may be connected in shunt across the series field windings 10 by means of a switch arm 31, as is diagrammatically indicated in the drawing.

In operation, when the electrode 14 is applied to the work 17 preparatory to establishing the welding arc, the resistance offered at the work is reduced to a minimum and the current in the welding circuit tends to rise to a high value, regardless of the position of the switch arm 31, but such excess flow of current is prevented by reason of the impedance offered by the reactance unit 12 interposed in the circuit. Upon drawing the arc, resistance is set up at the work, which resistance, of course, varies in accordance with variations in the length of the arc. When the arc is lengthened, for example, the arc resistance is increased, and in order to overcome such increase in resistance it becomes necessary to supply a greater voltage to the work to maintain a constant flow of current across the arc. The necessary increase in voltage is automatically provided for by reason of the fact that as the arc resistance is increased the flow of current through the shunt field circuit 26, 27, 25, 18, 24, 20 and 15, is correspondingly increased and further excitation by the windings 18 is afforded. Owing to the fact that the shunt field windings 18 and 19 are cumulatively arranged, this increased excitation of the field windings 18 strengthens the field of the generator, and consequently increases the voltage of the current furnished thereby with the result that a substantially constant current is maintained at the arc. If, on the other hand, the arc resistance is decreased, due to shortening of the arc, for example, there is a corresponding drop in the voltage of the current supplied to the arc by reason of the fact that upon such decrease in resistance less current will flow through the circuit 26, 27, 25, 18, 24, 20 and 15, and consequently decreased excitation by the field windings 18 is afforded. The field strength of the generator is thus decreased, with a consequent decrease in the voltage of the current supplied to the arc, which tends to keep the current at the arc constant under the condition assumed. At this point, it may be well to state that the field rheostat 27 may be employed to provide for a variation in the flow of current through the windings 18 from minimum to maximum, as desired, for a given resistance in the welding circuit. That is to say, the lower the resistance offered by the rheostat 27, the longer the arc may be drawn without opening the circuit. On the other hand, when the rheostat 27 is so set as to offer more resistance, the shorter is the arc which can be drawn without opening the circuit.

Under all conditions of operations, a current flows through the shut field circuit 22, 23, 21, 19 and 20, known as the circuit of fixed excitation. The current passing through this circuit may be fixed, of course, between limits, by the field rheostat 23 for a given voltage delivered by the generator, but if the voltage delivered by the generator rises due to increased arc resistance, the flow of current through this circuit will increase proportionately to the rise in such voltage. On the other hand, if the voltage delivered by the generator falls due to a decrease in arc resistance, the flow of current through the circuit of fixed excitation will decrease proportionately to the drop in voltage.

As hereinbefore explained, the resistance units 28, 29, 30, are of different values and may be selectively connected in shunt to the series field coils 10 to vary the current supplied to the arc. In this connection, it will be understood that the less resistance used in shunt with the series field windings 10, the less will be the excitation of the series field and the current delivered by the generator; and, conversely, the greater the resistance inserted in shunt with the series windings 10, the greater will be the current passing through said windings 10, thus effecting a corresponding increase in generator output, for the reason that the magnetic field already established by the shunt field windings 18 and 19 is augmented by the magnetic field produced by the series field windings 10 which are cumulatively wound with respect to the shut field windings 18 and 19.

From the above, it will become apparent to those skilled in the art that I have, in the absence of complicated mechanical and electro-mechanical controls, provided a reliable and dependable means for so regulating the welding current as to maintain a uniform or constant flow at the work regardless of such variations in the length of the welding arc as might occur under all conditions incident to operation.

What I claim is:

1. In a welding apparatus adapted to furnish current to a welding circuit, a self-excited generator having a series field winding constituting part of the welding circuit, electrodes located in said welding circuit, a shunt field winding connected to the brushes of the generator, and a second shunt field winding connected to one brush of the generator and to the welding circuit between the series winding and one of said electrodes.

2. In a welding apparatus adapted to furnish current to a welding circuit, a self-excited generator having a series field winding constituting part of the welding circuit, electrodes located in said welding circuit, a shunt field winding connected to the brushes of the generator, and a second shunt field winding connected to one brush of the generator and to the welding circuit between the series winding and one of said electrodes, said field windings being cumulatively arranged with reference to one another.

3. In a welding apparatus adapted to furnish current to a welding circuit, a generator having a series field winding constituting part of the welding circuit, electrodes and an impedance located in said welding circuit, said generator also including a shunt field winding connected to the brushes of the generator, and a second shunt field winding connected to one brush of the generator and to the welding circuit between the impedance and one of said electrodes.

4. In a welding apparatus adapted to furnish current to a welding circuit, a generator having a series field winding constituting part of the welding circuit, electrodes and an impedance located in said welding circuit, said generator also including a shunt field winding connected to the brushes of the generator, and a second shunt field winding connected to one brush of the generator and to the welding circuit between the impedance and one of said electrodes, said field windings being cumulatively arranged with reference to one another.

5. In a welding apparatus adapted to furnish current to a welding circuit, a generator having a series field winding constituting part of the welding circuit, electrodes in said welding circuit, and an impedance in said welding circuit between the series field winding and one of said electrodes, said generator also including a shunt field winding connected to the brushes of the generator, and a second shunt field winding connected to one brush of the generator and to the welding circuit between the impedance and said one electrode.

6. In a welding apparatus adapted to furnish current to a welding circuit, a generator having a series field winding constituting part of the welding circuit, electrodes in said welding circuit, and an impedance in said welding circuit between the series field winding and one of said electrodes, said generator also including a shunt field winding connected to the brushes of the generator, and a second shunt field winding connected to one brush of the generator and to the welding circuit between the impedance and said one electrode, said field windings being cumulatively arranged with reference to one another.

7. In a welding apparatus adapted to furnish current to a welding circuit, an armature, a series field winding and a current resisting device connected in series in the welding circuit, another field winding connected in shunt to said armature, and a third field winding connected in shunt to said armature, said series field winding and said current resisting device.

8. In a welding apparatus adapted to furnish current to a welding circuit, a self-excited generator having an armature and a series field winding in the welding circuit, electrodes in said welding circuit, a second field winding connected in shunt to said armature, and a third field winding connected in shunt to the arc formed between said electrodes in the welding circuit.

In testimony whereof, I have affixed my signature to this specification.

ALEXANDER CHURCHWARD.